United States Patent
Rajput et al.

(10) Patent No.: US 12,413,479 B1
(45) Date of Patent: Sep. 9, 2025

(54) METHODS, SYSTEMS, AND COMPUTER READABLE MEDIA FOR COMMUNICATING RETRY-AFTER HEADER FIELD VALUES TO CONSUMER NETWORK FUNCTIONS (NFs) VIA SERVICE COMMUNICATION PROXIES (SCPs)

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 3 days.

(21) Appl. No.: 18/677,212

(22) Filed: May 29, 2024

(51) Int. Cl.
*H04L 41/12* (2022.01)
*H04L 67/56* (2022.01)
*H04L 69/22* (2022.01)

(52) U.S. Cl.
CPC .............. *H04L 41/12* (2013.01); *H04L 67/56* (2022.05); *H04L 69/22* (2013.01)

(58) Field of Classification Search
CPC ................. H04L 41/12; H04L 41/5058; H04L 63/0281; H04L 67/02; H04L 67/1001;
(Continued)

(56) References Cited

U.S. PATENT DOCUMENTS

2007/0233896 A1* 10/2007 Hilt .......................... H04L 69/40
709/204
2019/0306202 A1* 10/2019 Sinha .................. H04L 65/1104
(Continued)

FOREIGN PATENT DOCUMENTS

CN 116762317 A * 9/2023 ......... H04L 41/5054

OTHER PUBLICATIONS

R. Shetty, A. Jangam and A. Simlai, "Intelligent Strategies for Overload Detection & Handling for 5G Network, " 2021 IEEE 4th 5G World Forum (5GWF), Montreal, QC, Canada, 2021, pp. 135-140, doi: 10.1109/5GWF52925.2021.00031. (Year: 2021).*
3rd Generation Partnership Project; Technical Specification Group Core Network and Terminals; 5G System; Restoration Procedures (Release 18) 3GPP TS 23.527 V18.3.0 pp. 1-52 (Mar. 2024).
(Continued)

*Primary Examiner* — Christopher Biagini
(74) *Attorney, Agent, or Firm* — Jenkins, Taylor & Hunt, P.A.

(57) ABSTRACT

A method for multi-NF Retry-After header field value propagation includes receiving, by an SCP and from a consumer NF, an SBI request message and determining that the SBI request message requests a service that can be provided by first and second producer NFs. The method further includes forwarding the SBI request message to a first producer NF and receiving a response message indicating that the first producer NF failed to process the SBI request message and including a first Retry-After header field value. The method further includes forwarding the SBI request message to the second producer NF and receiving a response message from the second producer NF indicating that the second producer NF failed to process the SBI request message and including a second Retry-After header field value. The method further includes communicating, by the SCP and to the consumer NF, the first and second Retry-After header field values.

20 Claims, 6 Drawing Sheets

(58) Field of Classification Search
CPC ......... H04L 67/51; H04L 67/55; H04L 67/56; H04L 67/563; H04L 67/63; H04L 69/22; H04M 15/66; H04M 15/83; H04W 12/084; H04W 4/50; H04W 48/16; H04W 84/042; H04W 88/182
See application file for complete search history.

(56) References Cited

U.S. PATENT DOCUMENTS

| | | | | |
|---|---|---|---|---|
| 2020/0412788 | A1* | 12/2020 | Sodagar | H04L 67/566 |
| 2023/0147549 | A1* | 5/2023 | Singh | H04L 41/5041 |
| | | | | 709/223 |
| 2024/0137395 | A1* | 4/2024 | Sabeur | H04L 65/1016 |

OTHER PUBLICATIONS

3rd Generation Partnership Project; Technical Specification Group Core Network and Terminals; 5G System; Technical Realization of Service Based Architecture; Stage 3 (Release 18) 3GPP TS 29.500 V18.5.0 pp. 1-150 (Mar. 2024).

3rd Generation Partnership Project; Technical Specification Group Core Network and Terminals; 5G System; Network Function Repository Services; Stage 3 (Release 18) 3GPP TS 29.510 V18.6.0 pp. 1-412 (Mar. 2024).

3rd Generation Partnership Project; Technical Specification Group Core Network and Terminals; 5G System; Common Data Types for Service Based Interface (Release 18) 3GPP TS 29.571 V18.5.0 pp. 1-234 (Mar. 2024).

Fielding, R., Hypertext Transfer Protocol (HTTP/1.1): Semantics and Content; IETF RFC 7231 pp. 1-101 (Jun. 2014).

* cited by examiner

METHODS, SYSTEMS, AND COMPUTER READABLE MEDIA FOR COMMUNICATING RETRY-AFTER HEADER FIELD VALUES TO CONSUMER NETWORK FUNCTIONS (NFs) VIA SERVICE COMMUNICATION PROXIES (SCPs)

TECHNICAL FIELD

The subject matter described herein relates to communicating information from producer NFs to consumer NFs via SCPs. More particularly, the subject matter described herein relates to methods, systems, and computer readable media for communicating Retry-After header field values to consumer NFs via SCPs.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks is that an error response communicated to a consumer NF via an SCP can only carry a single Retry-After header field value, which may be insufficient when multiple producer NFs fail to process a service request. The Retry-After header field value indicates how long a consumer NF should wait before re-sending a service request to a producer NF. A consumer NF can specify a routing binding in a service request that allows the service request to be sent to more than one producer NF for processing. In networks that use indirect routing, the consumer NF sends the service request to an SCP. The SCP will attempt to send the service request to multiple producer NFs specified by the routing binding. Each producer NF that fails to process the service request will return an error response to the SCP with a Retry-After header field specifying a value indicating the time that the consumer NF should wait before re-attempting the service request. In one current network architecture, when the last producer NF fails to process the service request, the SCP sends an error response to the consumer NF. The error response carries the Retry-After header field value of the last producer NF that failed to process the service request. The Retry-After header field values of the other producer NFs that failed to process the service request are not communicated to the consumer NF. As a result, the consumer NF may reattempt to send the service request to the producer NFs without regard to the Retry-After header field values of some of the producer NFs, which may lead to subsequent failures in processing the service request.

Accordingly, in light of these and other difficulties there exists a need for improved methods, systems and computer readable media for communicating Retry-After header field values to NF service consumers via SCPs.

SUMMARY

A method for multi-NF Retry-After header field value propagation in networks using indirect communication via SCPs includes receiving, by an SCP and from a consumer NF, an SBI request message. The method further includes determining that the SBI request message requests a service that can be provided by first and second producer NFs. The method further includes forwarding, by the SCP, the SBI request message to the first producer NF. The method further includes receiving, by the SCP and from the first producer NF, a response message indicating that the first producer NF failed to process the SBI request message and including a first Retry-After header field value generated by the first producer NF. The method further includes forwarding, by the SCP, the SBI request message to the second producer NF. The method further includes receiving, by the SCP, a response message from the second producer NF indicating that the second producer NF failed to process the SBI request message and including a second Retry-After header field value generated by the second producer NF. The method further includes communicating, by the SCP and to the consumer NF, the first and second Retry-After header field values.

According to another aspect of the subject matter described herein, receiving the SBI request message includes receiving an SBI request message with a 3gpp-Sbi-Routing-Binding header including first and second routing binding indications identifying the first and second producer NFs as target NFs for the service.

According to another aspect of the subject matter described herein, determining that the service can be provided by the first and second producer NFs includes reading NF instance identifiers of the first and second producer NFs from the first and second routing binding indications.

According to another aspect of the subject matter described herein, receiving the response message from the first producer NF includes receiving an error response message including the first Retry-After header field value.

According to another aspect of the subject matter described herein, receiving the response message from the second producer NF includes receiving an error response message including the second Retry-After header field value.

According to another aspect of the subject matter described herein, communicating the first and second Retry-After header field values to the consumer NF includes transmitting, to the consumer NF, an SBI response message including the first and second Retry-After header field values.

According to another aspect of the subject matter described herein, transmitting the SBI response message including the first and second Retry-After header field values comprises including the first and second Retry-After header field values in ProblemDetails in a body of the SBI response message.

According to another aspect of the subject matter described herein, receiving the response message from the first producer NF includes receiving the response message including a location header including a resource uniform resource indicator (URI) identifying a resource to which retries of the SBI request message should be directed and further comprising, communicating, by the SCP and to the consumer NF, the resource URI.

According to another aspect of the subject matter described herein, transmitting the SBI response message including the first and second Retry-After header field values comprises including at least one of the first and second Retry-After header field values in a header of the SBI response message.

According to another aspect of the subject matter described herein, including at least one of the first and second Retry-After header field values in a header of the SBI response message comprises adding a custom header to the SBI response message and including one of the first and second Retry-After header field values in the custom header and including the other of the first and second Retry-After header field values as a JavaScript object notation (JSON) information element (IE) included in a body of the SBI response message.

According to another aspect of the subject matter described herein, a system for multi-network function (NF) Retry-After header field value propagation in networks using indirect communication via service communication proxies (SCPs) is provided. The system includes an SCP including at least one processor and a memory. The system further includes an SBI routing manager implemented by the at least one processor for receiving, from a consumer NF, an SBI request message, determining that the SBI request message requests a service that can be provided by first and second producer NFs, forwarding the SBI request message to the first producer NF, receiving, from the first producer NF, a response message indicating that the first producer NF failed to process the SBI request message and including a first Retry-After header field value generated by the first producer NF, forwarding the SBI request message to the second producer NF, and receiving a response message from the second producer NF indicating that the second producer NF failed to process the SBI request message and including a second Retry-After header field value generated by the second producer NF. The system further includes a Retry-After header field value communicator implemented by the at least one processor for communicating, to the consumer NF, the first and second Retry-After header field values.

According to another aspect of the subject matter described herein, the SBI request message includes a 3gpp-Sbi-Routing-Binding header with first and second routing binding indications identifying the first and second producer NFs as target NFs for the service and the SBI routing manager is configured to determine that the service can be provided by the first and second producer NFs by reading NF instance identifiers of the first and second producer NFs from the first and second routing binding indications.

According to another aspect of the subject matter described herein, the response message from the first producer NF comprises an error response message including the first Retry-After header field value.

According to another aspect of the subject matter described herein, the response message from the second producer NF comprises an error response message including the second Retry-After header field value.

According to another aspect of the subject matter described herein, the Retry-After header field value communicator is configured to communicate the first and second Retry-After header field values to the consumer NF by transmitting, to the consumer NF, an SBI response message including the first and second Retry-After header field values.

According to another aspect of the subject matter described herein, the Retry-After header field value communicator is configured to include the first and second Retry-After header field values in ProblemDetails in a body of the SBI response message.

According to another aspect of the subject matter described herein, the response message from the first producer NF includes a location header including a resource uniform resource indicator (URI) identifying a resource to which retries of the SBI request message should be directed and the Retry-After header field value communicator is configured to communicate the resource URI to the consumer NF.

According to another aspect of the subject matter described herein, the Retry-After header field value communicator is configured to include at least one of the first and second Retry-After header field values in a header of the SBI response message.

According to another aspect of the subject matter described herein, the Retry-After header field value communicator is configured to add a custom header to the SBI response message and include one of the first and second Retry-After header field values in the custom header and include the other of the first and second Retry-After header field values as a JavaScript object notation (JSON) information element (IE) included in a body of the SBI response message.

According to another aspect of the subject matter described herein, a non-transitory computer readable medium having stored thereon executable instructions that when executed by a processor of a computer control the computer to perform steps is provided. The steps include receiving, by a service communication proxy (SCP) and from a consumer network function (NF), a service-based interface (SBI) request message. The steps further include determining, by the SCP, that the SBI request message requests a service that can be provided by first and second producer NFs. The steps further include forwarding, by the SCP, the SBI request message to the first producer NF. The steps further include receiving, by the SCP and from the first producer NF, a response message indicating that the first producer NF failed to process the SBI request message and including a first Retry-After header field value generated by the first producer NF. The steps further include forwarding, by the SCP, the SBI request message to the second producer NF. The steps further include receiving, by the SCP, a response message from the second producer NF indicating that the second producer NF failed to process the SBI request message and including a second Retry-After header field value generated by the second producer NF. The steps further include communicating, by the SCP and to the consumer NF, the first and second Retry-After header field values.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
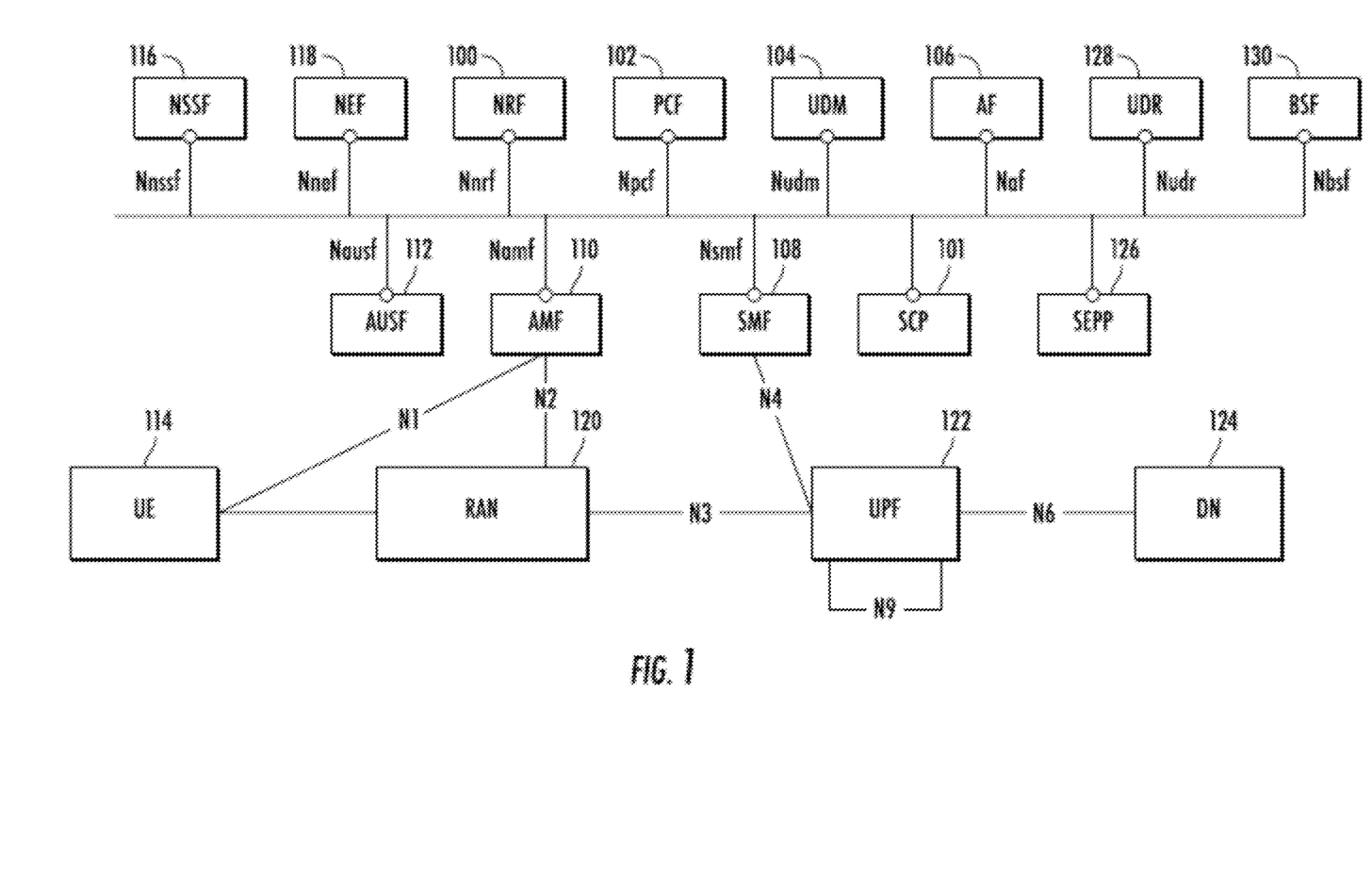
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an AMF 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can occur in 5G and subsequent generation networks is that an SCP is only capable of communicating a single Retry-After header field value to a consumer NF in an indirect communication scenario where the SCP tries, on behalf of the consumer NF, to obtain service from multiple producer NFs. In one example, a PCF communicates with AMF(s) for a UE policy transfer to the UE as part of UE policy management procedures. The PCF may communicate with the AMFs via an SCP using indirect communications. When multiple AMFs return error messages, each having a Retry-After header, the SCP propagates only the last Retry-After header to the PCF. As a result, the PCF may not wait for the appropriate time before retrying the service request with the AMF(s). A similar problem can occur with other SBI flows for indirect communication.

The problem of not being able to communicate multiple Retry-After header field values to the consumer NF may not occur in direct communication without an SCP, because each error response is communicated directly to the consumer NF and includes the Retry-After header field value for the responding producer NF. Because the consumer NF has the Retry-After header field values of all of the producer NFs that can process the service request, the consumer NF can wait for the appropriate time period before resending the service request.

The subject matter described herein addresses the Retry-After header field communication problem at the SCP by propagating multiple Retry-After header field values in an error response message. In one example, the SCP may create custom headers, populate the custom headers with the Retry-After header field values, and add the custom headers to the error response message. In another example, one of the Retry-After header field values may be communicated to the consumer NF in a JSON information element (IE) in the ProblemDetails in the body of the error response message and the other Retry-After header field value(s) may be communicated in custom headers added to the error response message. The consumer NF decodes the different Retry-After header field values from the error response message and uses the values to determine an appropriate time to wait before retrying the service request.

A consumer NF may identify multiple producer NFs that can provide a requested service using a 3gpp-Sbi-Routing-Binding header. The 3GPP-Sbi-Routing-Binding header is defined in clause 5.2.3.2.5 of 3GPP TS 29.500 and its use for target resource reselection is described in clause 6.12 of 3GPP TS 29.500 and clause 6.5 of 3GPP TS 23.527. For example, clause 6.12 of 3GPP TS 29.500 states:

The NF Service Consumer shall store the Binding Indication received from the NF Service Producer and include it in a 3gpp-Sbi-Routing-Binding header in subsequent related service requests targeting the NF Service Resource. The NF Service Consumer or the SCP shall use this information for selecting or reselecting an NF Service Producer which has access to the NF Service Resource context, for direct or indirect communication respectively, as specified in clause 6.3.1.0 of 3GPP TS 23.501 [3].

The above-quoted passage from 3GPP TS 29.500 indicates that binding indications communicated by NF service consumers in 3gpp-Sbi-Routing-Binding headers may be used by the consumer NF or SCP in NF selection or NF reselection (e.g., when processing of an NF service request by one NF instance fails). The following passage from clause 6.5.3.3 of 3GPP TS 29.500 further describes the use of routing binding indications by the SCP for producer NF reselection:

If an SCP detects that the target NF service producer is not available, the SCP shall reselect a new NF service producer based on the Routing Binding Indication and/or 3gpp-Sbi-Discovery headers, if such information has been provided by the NF service consumer in the request. See clause 6.5 in 3GPP TS 23.527 [38].

From the passages above, if an SCP receives a service request with a 3gpp-Sbi-Routing-Binding header, the SCP will use the binding indications in the header for producer NF instance selection and reselection if the first producer NF that the SCP contacts is unavailable.

As mentioned above, the Retry-After header field carries a value to indicate how long a consumer NF should wait before re-contacting a producer NF. The Retry-After header field value is defined in Internet Engineering Task Force (IETF) Request for Comments (RFC) 7231. Servers send the "Retry-After" header field to indicate how long the user agent ought to wait before making a follow-up request. When sent with a 503 (Service Unavailable) response, Retry-After indicates how long the service is expected to be unavailable to the client. When sent with any 3xx (Redirection) response, Retry-After indicates the minimum time that the user agent is asked to wait before issuing the redirected request.

The value of the Retry-After header field can be either an HTTP-date or a number of seconds to delay after the response is received.

Retry-After=HTTP-date/delay-seconds

A delay-seconds value is a non-negative decimal integer, representing time in seconds.

delay-seconds=1*DIGIT

Two examples of Retry-After header field values are:

Retry-After: Fri, 31 Dec 1999 23:59:59 GMT

Retry-After: 120

In the former example, the delay is from the current time until the time specified in the Retry-After header field. In the latter example, the delay is 2 minutes.

Another message attribute that may be of interest in SBI service responses is the ProblemDetails whose data type is defined in Table 5.2.4.1-1 of 3GPP TS 29.571. An example of some of the attributes included in the ProblemDetails data type are:

"title": "Service Unavailable",

"status": 503,

"detail": "The message has been discarded due to processXYZ overloaded at 90%",

"cause": "NF_CONGESTION"

As indicated above, the ProblemDetails data type includes details of a failed processing attempt by an NF service producer. As will be described in more detail below, the ProblemDetails data type can be expanded to include Retry-After header field values as follows:

"NF_Instance_ID1": "AMF1"

"Retry-After":"100"

"NF_Instance_ID2":"AMF2"

"Retry-After":"50"

When the ProblemDetails are expanded as indicated above, the ProblemDetails can communicate to a consumer NF multiple Retry-After header field values for multiple producer NF instances.

Figure 2:
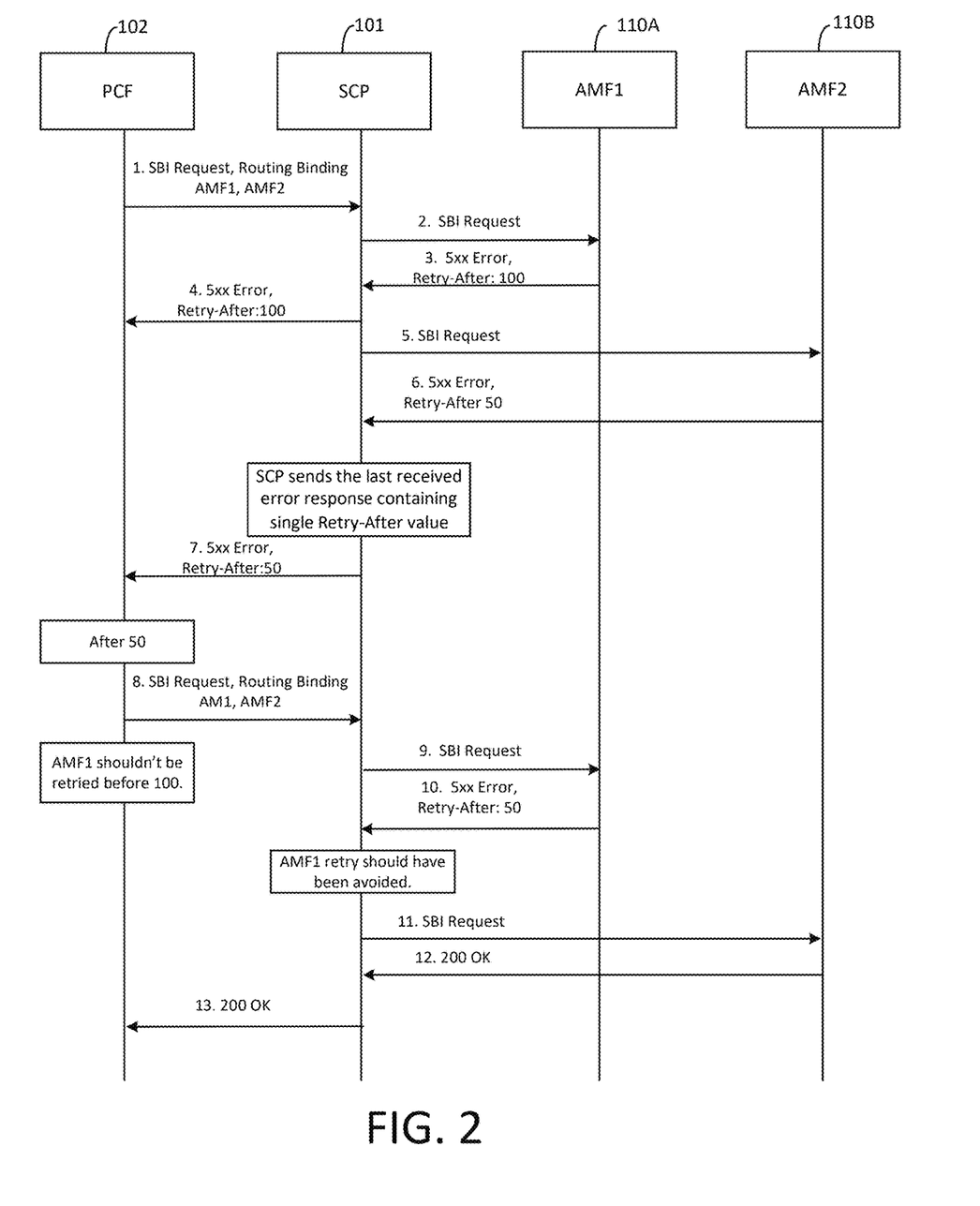
FIG. 2 is a message flow diagram illustrating an example where a policy control function (PCF) attempts to obtain service from a plurality of access and mobility management functions (AMFs) in an indirect routing scenario where the SCP can only communicate a single Retry-After header field value to the PCF.

As indicated above, one problem with current Retry-After header communication methods is that a consumer NF may not receive the Retry-After header field values from all producer NFs in an indirect routing scenario where the SCP contacts multiple producer NFs to satisfy a service request from the consumer NF. FIG. 2 is a message flow diagram illustrating an example where a PCF attempts to obtain service from a plurality of AMFs in an indirect routing scenario where the SCP can only communicate a single Retry-after header field value to the PCF. In the example illustrated in FIG. 2, in steps 1-6, PCF 102 attempts to invoke the NamfCommunication service from AMFs 110A and 110B via SCP 101 to transfer UE policies to the UE for UE policy management. In the SBI request message in step 1, PCF 102 includes a 3gpp-Sbi-Routing-Binding header with routing binding indications identifying multiple AMF(s) 110A and 110B, which can return different Retry-After header field values as illustrated by steps 3 and 6, but SCP 101 can propagate only a single Retry-After header field value (step 7), which is a problem for subsequent re-attempts.

In step 8, PCF 102 retries AMFs 110A and 110B based on the Retry-After header field value, but with the same 3gpp-Sbi-Routing-Binding values used in step 1, which is okay for the AMF whose Retry-After header field value is returned in step 6 but not for other AMFs with different Retry-After header field values. This leads to incorrect retries in the network and error responses (steps 9 and 10) which could have been avoided. The retry event in step 11 is successful and results in a success response in step 12, which is communicated to PCF 102 in step 13. SCP 101 should provide a mechanism to propagate multiple Retry-After header field values from different NF service producers when indirect communication is used in the network.

Figure 3:
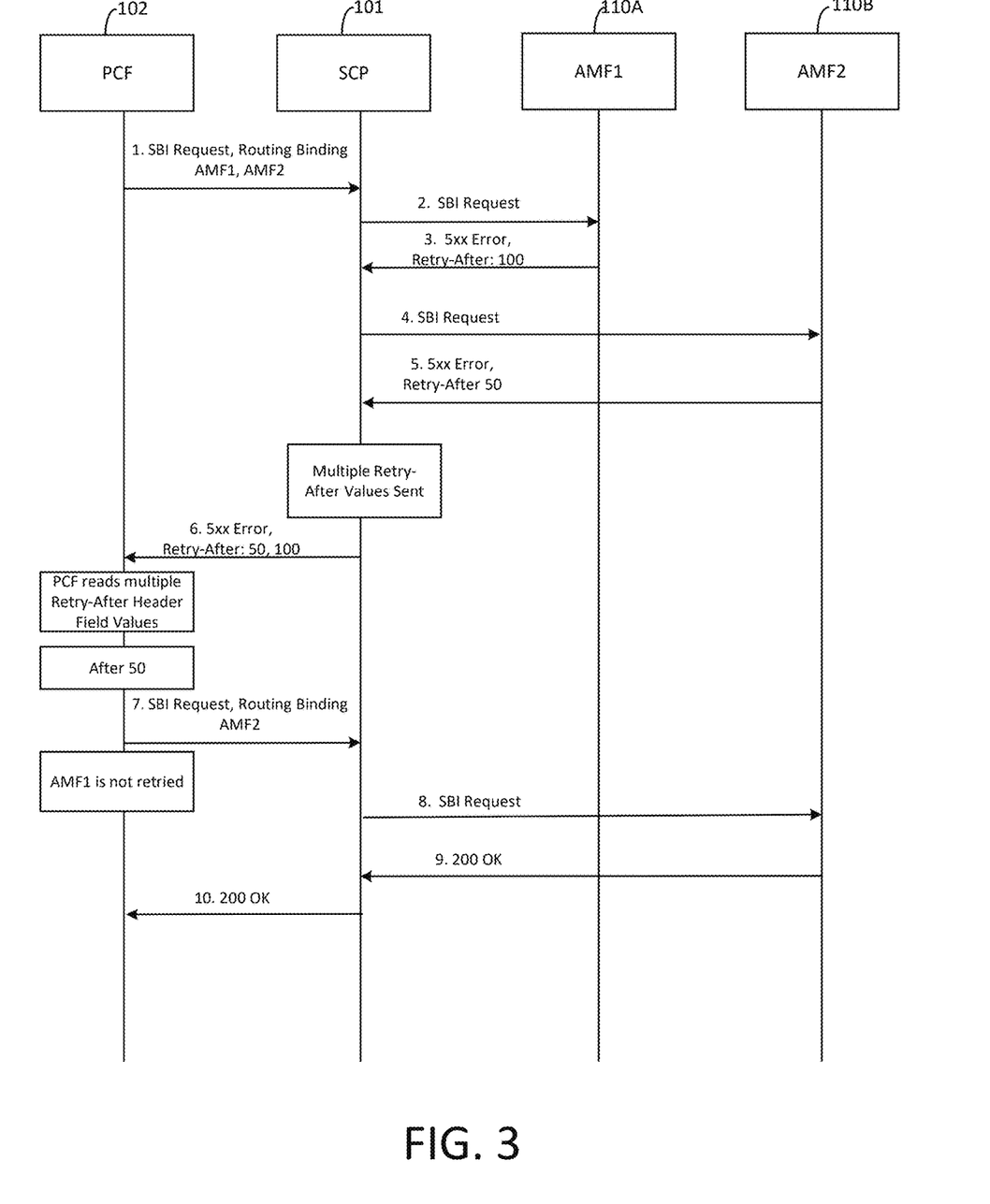
FIG. 3 is a message flow diagram illustrating an example where a PCF attempts to obtain service from a plurality of AMFs in an indirect routing scenario where the SCP is configured to communicate multiple Retry-After header field values to the PCF.

To address the problem illustrated in FIG. 2, the SCP is enhanced to encode multiple Retry-After header field values in a single SBI response message. One way to encode the multiple Retry-After header field values is to use Problem-Details in the response message body and to include the Retry-After header field values as JSON IEs in the ProblemDetails. New response headers can also be used to encode the Retry-After header field values. FIG. 3 is a message flow diagram illustrating an example where a PCF attempts to obtain service from a plurality of AMFs in an indirect routing scenario where the SCP is configured to communicate multiple Retry-After header field values to the PCF. Referring to FIG. 3, in step 1, PCF 102 sends an SBI request to SCP 101. The SBI request includes a 3gpp-Sbi-Routing-Binding header specifying binding indications identifying AMF1 110A and AMF2 110B. In step 2, SCP 101 sends an SBI request to AMF1 110A. In step 3, AMF1 110A responds with a 5xx error response including a Retry-After header field value of 100. In step 4, SCP 101 sends an SBI request to AMF2 110B. In step 5, AMF2 110B responds with a 5xx error response including a Retry-After header field value of 50. The error response can also be a 4xx response, such as a 429 error response.

In step 6, rather than communicating the 5xx error response to PCF 102 with a single Retry-After header field value, SCP 101 includes multiple Retry-After header field values in the 5xx error response message transmitted to PCF 102. PCF 102 receives the 5xx error response and reads the multiple Retry-After header field values. After 50 seconds, PCF 102 retries the SBI request but only specifies AMF2 110B in the routing binding. In step 8, SCP 101 forwards the SBI request to AMF2 110B. In step 9, AMF 2 110B processes the SBI request and returns a success response. In step 10, SCP 101 forwards the success response to PCF 102.

In one example, a new custom or vendor-specific header, referred to as the Retry-After header, can be added to an SBI response message generated by an SCP. The Retry-After header may include an NF instance identifier identifying the producer NF to which the Retry-After header field value applies, the identifier "Retry-After" to identify the Retry-After header, and the Retry-After value indicating the time in seconds (or the date/time) before which an SBI request should not be re-attempted with the producer NF. If the SCP has more than one Retry-After header field value to communicate to the producer NF, the SCP may include multiple Retry-After headers in the SBI response message. An example of encoding multiple Retry-After headers in the SBI response message is as follows:

{
"title": "Service Unavailable",
"status": 503,
"detail": "The message has been discarded due to processXYZ overloaded at 90%",
"cause": "NF_CONGESTION",
"headers": [
{
"NF": "AMF1",
"header": "Retry-After",
"value": 100
},
{
"NF": "AMF2",
"header": "Retry-After",
"value": 50
}

In the example encoding, two custom Retry-After headers with two different Retry-After header field values are added to an SBI response message-one custom Retry-After header for AMF1 110A and one custom Retry-After header for AMF2 110B.

The subject matter described herein is not limited to encoding Retry-After header field values in custom headers appended to an SBI response message. In an alternate example, one or more of the Retry-After header field values may be included as a JSON IE included in or with the ProblemDetails in the body of an SBI response message. Encoding a single Retry-After header field value as a JSON IE in the SBI response message body may be used in combination with the custom Retry-After header illustrated above to communicate multiple Retry-After header field values to a consumer NF. For example, the SCP may communicate the Retry-After header field value for AMF1 110A using a JSON IE in the response message body and the Retry-After header field value for AMF2 110B using a custom header. Alternatively, the Retry-After header field values for AMF1 110A and AMF2 110B may be communicated to the consumer NF using two JSON IEs in the SBI response message body.

Figure 4:
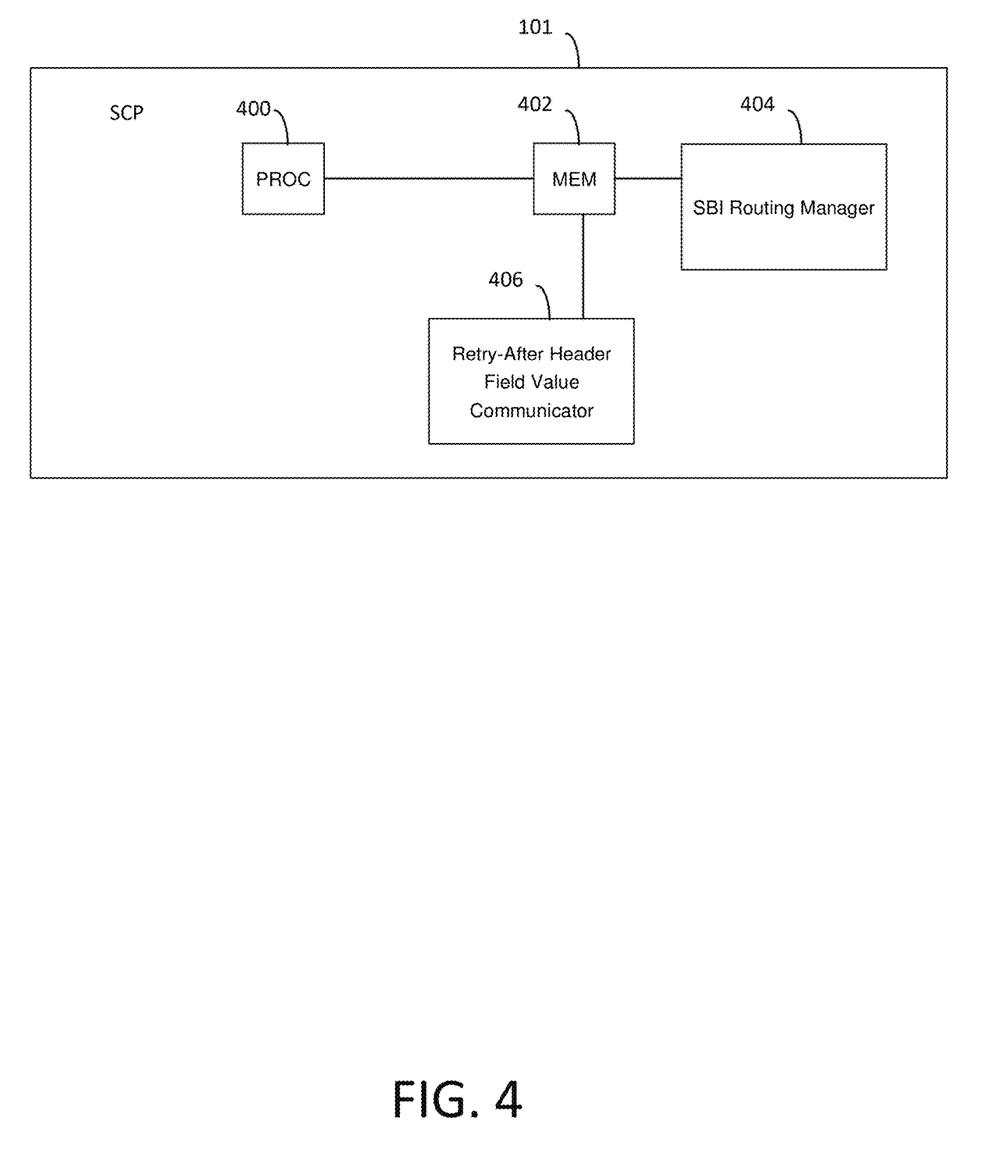
FIG. 4 is a block diagram illustrating an exemplary architecture for an SCP for communicating multiple Retry-After header field values to a consumer NF.

FIG. 4 is a block diagram illustrating an exemplary architecture for an SCP for communicating multiple Retry-After header field values to a consumer NF. Referring to FIG. 4, SCP 101 includes at least one processor 400 and memory 402. SCP 101 further includes an SBI routing manager 404 that handles routing of SBI request messages, for example, using routing binding information obtained from NF service consumers and/or from an NRF. SCP 101 further includes a Retry-After header field value communicator 406 for performing the steps described herein for communicating multiple Retry-After header field values to a consumer NF. SBI routing manager 404 and Retry-After header field value communicator 406 may be implemented using computer-executable instructions stored in memory 402 and executed by processor 400.

Figure 5:
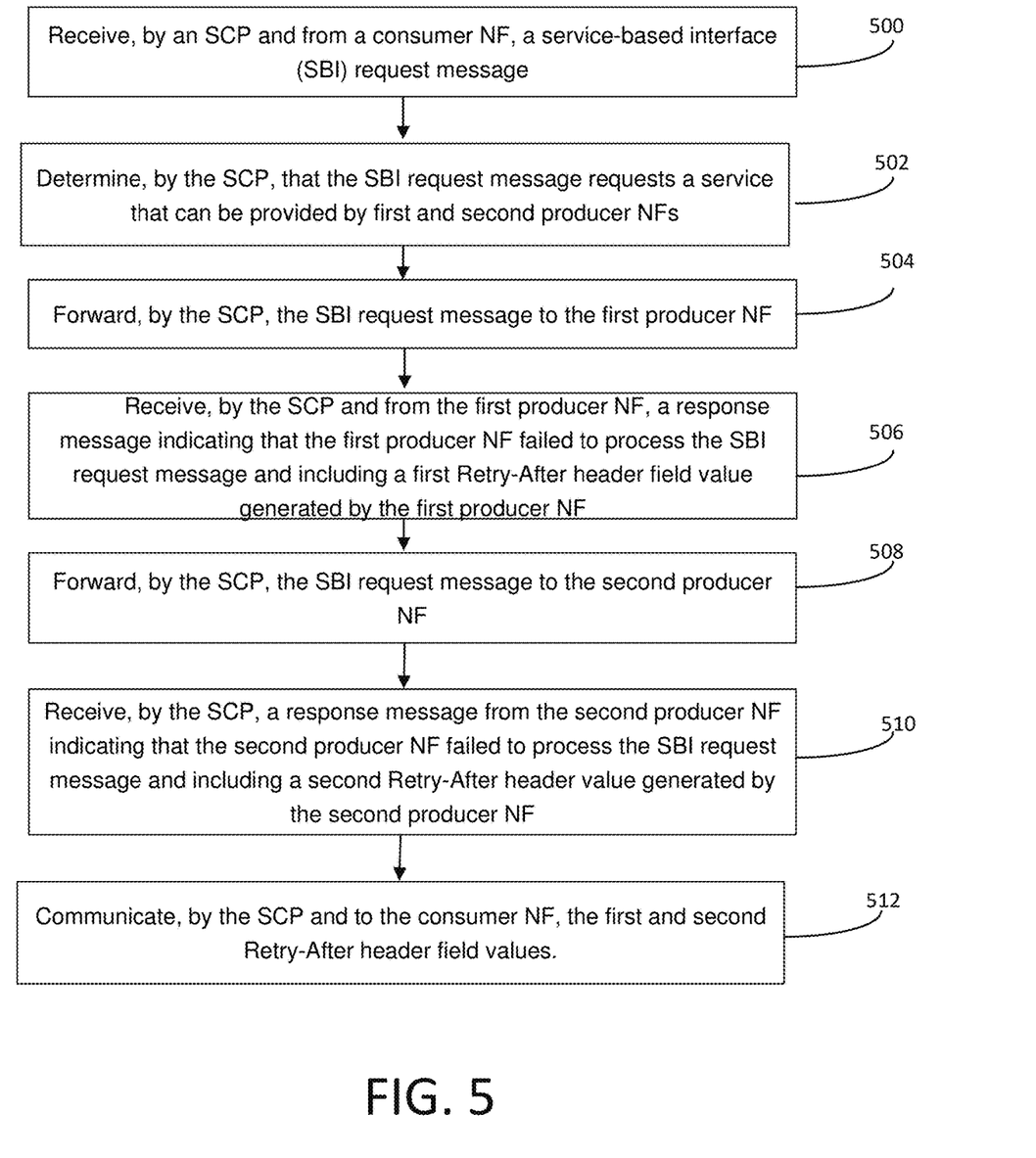
FIG. 5 is a flow chart illustrating an exemplary process for communicating multiple Retry-After header field values to a consumer NF.

FIG. 5 is a flow chart illustrating an exemplary process for communicating multiple Retry-After header field values to a consumer NF. Referring to FIG. 5, in step 500, the process includes receiving, by an SCP and from a consumer NF, an SBI request message. For example, SCP 101 may receive an SBI request message from a consumer NF, such as PCF 102. The SBI request message may include a 3gpp-Sbi-Routing-Binding header including multiple routing binding indications that identify multiple producer NFs capable of providing the service requested by the SBI request.

In step 502, the process further includes determining, by the SCP, that the SBI request message requests a service that can be provided by first and second producer NFs. For example, an SCP, such as SCP 101, may read the NF instance IDs of producer NFs capable of providing the service requested by the SBI request from the routing binding indications in the 3gpp-Sbi-Routing-Binding header of the SBI request message.

In step 504, the process further includes forwarding, by the SCP, the SBI request message to the first producer NF. For example, an SCP, such as SCP 101, may select, e.g., based on priority, one of the producer NF instances identified by the routing binding indications for processing the SBI request message and forward the SBI request message to the selected producer NF instance.

In step 506, the process further includes receiving, by the SCP and from the first producer NF, a response message indicating that the first producer NF failed to process the SBI request message and including a first Retry-After header field value generated by the first producer NF. For example, an SCP, such as SCP 101, may receive a 4xx or 5xx error response message from the first producer NF instance, where the error response message includes a Retry-After header field value for the first producer NF instance. Rather than discarding the Retry-After header field value for the first producer NF instance, SCP 101 stores the Retry-After header field value for the first producer NF instance along with the NF instance identifier of the first producer NF instance.

In step 508, the process further includes forwarding, by the SCP, the SBI request message to the second producer NF. For example, an SCP, such as SCP 101, may retry the SBI request by forwarding the request to the next highest priority producer NF instance specified by the routing binding indications.

In step 510, the process further includes receiving, by the SCP, a response message from the second producer NF indicating that the second producer NF failed to process the SBI request message and including a second Retry-After header field value generated by the second producer NF. For example, an SCP, such as SCP 101, may receive an error response message from the second producer NF instance indicating that the second producer NF instance failed to process the SBI request message and including a second Retry-After header for the second producer NF instance. SCP 101 may continue to reattempt transmission of the SBI request message until all of the producer NFs identified by the routing bindings have been attempted (provided that none are successful) and may store the Retry-After header field values returned by each of the producer NFs along with its NF instance ID.

In step 512, the process further includes communicating, by the SCP and to the consumer NF, the first and second Retry-After header field values. For example, an SCP, such as SCP 101, may communicate, in a single SBI response message, the Retry-After header field values returned by each of the producer NFs to which the SBI request was transmitted and from which an error response was received. The Retry-After header field values may be included in the message body and/or in one or more custom headers added to the SBI response message.

Exemplary advantages of the subject matter described herein include reduced messaging in the network by reducing the likelihood of unnecessary early retries of SBI request messages to producer NF instances. By communicating multiple Retry-After header field values to a consumer NF, the consumer NF is more likely to calculate or determine the correct retry time for contacting each producer NF. Network resiliency is improved by reducing the likelihood of the producer NF sending multiple retries to unavailable producer NF instances. Reducing unnecessary retries also reduces latency in processing of SBI request messages. The likelihood of the consumer NF selecting the correct producer NF for a retry attempt is increased. Reducing unnecessary retry attempts also conserves processing resources of consumer NFs, producer NFs, and SCPs.

Figure 6:
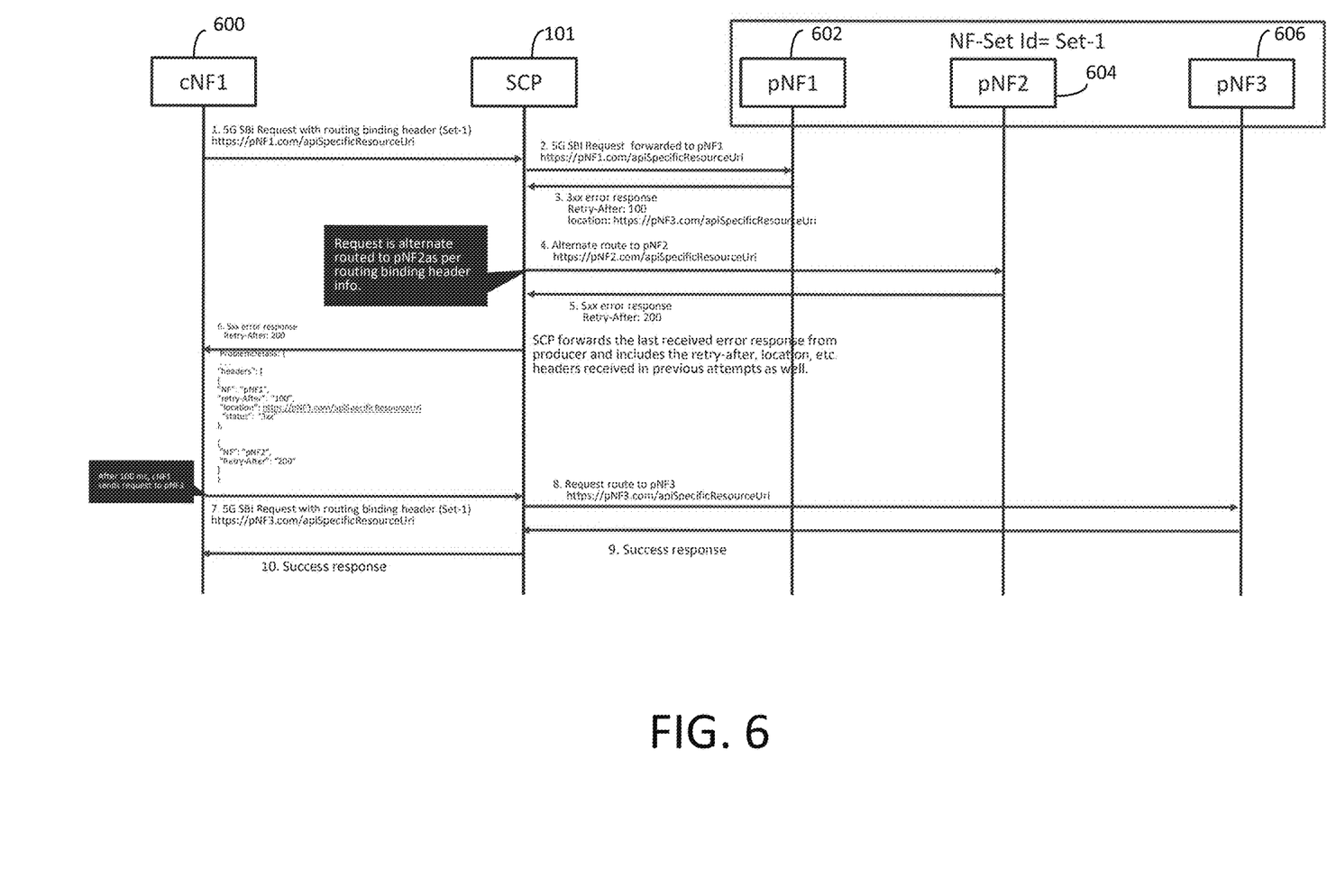
FIG. 6 is a message flow diagram illustrating an example where the SCP communicates, to the consumer NF, header values from previous SBI responses in addition to the retry-After header field value.

The methodology described herein for communicating Retry-After header field values in an SBI response can be extended to other information communicated by the SCP in the SBI response. FIG. 6 is a message flow diagram illustrating an example where the SCP communicates, to the consumer NF, header values from previous SBI responses in addition to the Retry-After header field value. In FIG. 6, in step 1, a consumer NF 600 sends an SBI request with a 3gpp-Sbi-Routing-Binding header identifying NF set 1 and a specific resource URI to SCP 101. In step 2, SCP 101 sends the SBI request to a producer NF 602 as specified by the NF set and the resource URI in the routing binding header. Producer NF 602 fails to process the SBI request and, in step 3, sends a 3xx error response to SCP 101. The 3xx error response includes a Retry-After header field value of 100 and a location header identifying a specific resource URI on another NF associated with the NF set to which the retry attempt should be directed.

In step 4, SCP 101 retries the SBI request by sending the request to producer NF 602 as per the routing binding. In step 5, producer NF 602 sends a 5xx error response with a retry-after header field value of 200.

In step 7, consumer NF 200, after waiting for the Retry-After time of 100 specified by producer NF 602, retries the SBI request to producer NF 606 as specified by the location header value received in the error response message in step 6. In step 8, SCP 101 forwards the SBI request to producer NF 606. In step 9, producer NF 606 successfully processes the SBI request and sends a success response to SCP 101. In step 10, SCP 101 sends the success response to consumer NF 600.

The disclosure of each of the following references is hereby incorporated herein by reference in its entirety.

REFERENCES 1. 3*rd* Generation Partnership Project; Technical Specification Group Core Network and Terminals; 5G System;

Network Function Repository Services; Stage 3 (Release 18) 3GPP TS 29.510 V18.6.0 (2024 March)
2. 3$^{rd}$ Generation Partnership Project; Technical Specification Group Core Network and Terminals; 5G System; Technical Realization of Service Based Architecture; Stage 3 (Release 18) 3GPP TS 29.500 V18.5.0 (2024 March)
3. 3$^{rd}$ Generation Partnership Project; Technical Specification Group Core Network and Terminals; 5G System; Restoration Procedures (Release 18) 3GPP TS 23.527 V18.3.0 (2024 March)
4. 3$^{rd}$ Generation Partnership Project; Technical Specification Group Core Network and Terminals; 5G System; Common Data Types for Service Based Interface (Release 18) 3GPP TS 29.571 V18.5.0 (2024 March)
5. Fielding, R., Hypertext Transfer Protocol (HTTP/1.1): Semantics and Content; IETF RFC 7231 (June 2014).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for multi-network function (NF) Retry-After header field value propagation in networks using indirect communication via service communication proxies (SCPs), the method comprising:
receiving, by an SCP and from a consumer NF, a service-based interface (SBI) request message;
determining, by the SCP, that the SBI request message requests a service that can be provided by first and second producer NFs;
forwarding, by the SCP, the SBI request message to the first producer NF;
receiving, by the SCP and from the first producer NF, a response message indicating that the first producer NF failed to process the SBI request message and including a first Retry-After header field value generated by the first producer NF;
forwarding, by the SCP, the SBI request message to the second producer NF;
receiving, by the SCP, a response message from the second producer NF indicating that the second producer NF failed to process the SBI request message and including a second Retry-After header field value generated by the second producer NF; and
communicating, by the SCP and to the consumer NF, the first and second Retry-After header field values.

2. The method of claim 1 wherein receiving the SBI request message includes receiving an SBI request message with a 3gpp-Sbi-Routing-Binding header including first and second routing binding indications identifying the first and second producer NFs as target NFs for the service.

3. The method of claim 2 wherein determining that the service can be provided by the first and second producer NFs includes reading NF instance identifiers of the first and second producer NFs from the first and second routing binding indications.

4. The method of claim 1 wherein receiving the response message from the first producer NF includes receiving an error response message including the first Retry-After header field value.

5. The method of claim 4 wherein receiving the response message from the second producer NF includes receiving an error response message including the second Retry-After header field value.

6. The method of claim 1 wherein communicating the first and second Retry-After header field values to the consumer NF includes transmitting, to the consumer NF, an SBI response message including the first and second Retry-After header field values.

7. The method of claim 6 wherein transmitting the SBI response message including the first and second Retry-After header field values comprises including the first and second Retry-After header field values in Problem Details in a body of the SBI response message.

8. The method of claim 1 wherein receiving the response message from the first producer NF includes receiving the response message including a location header including a resource uniform resource indicator (URI) identifying a resource to which retries of the SBI request message should be directed and further comprising, communicating, by the SCP and to the consumer NF, the resource URI.

9. The method of claim 6 wherein transmitting the SBI response message including the first and second Retry-After header field values comprises including at least one of the first and second Retry-After header field values in a header of the SBI response message.

10. The method of claim 9 wherein including at least one of the first and second Retry-After header field values in a header of the SBI response message comprises adding a custom header to the SBI response message and including one of the first and second Retry-After header field values in the custom header and including the other of the first and second Retry-After header field values as a JavaScript object notation (JSON) information element (IE) included in a body of the SBI response message.

11. A system for multi-network function (NF) Retry-After header field value propagation in networks using indirect communication via service communication proxies (SCPs), the system comprising:
an SCP including at least one processor and a memory;
a service-based interface (SBI) routing manager implemented by the at least one processor for receiving, from a consumer NF, an SBI request message, determining that the SBI request message requests a service that can be provided by first and second producer NFs, forwarding the SBI request message to the first producer NF, receiving, from the first producer NF, a response message indicating that the first producer NF failed to process the SBI request message and including a first Retry-After header field value generated by the first producer NF, forwarding the SBI request message to the second producer NF, and receiving a response message from the second producer NF indicating that the second producer NF failed to process the SBI request message and including a second Retry-After header field value generated by the second producer NF; and
a Retry-After header field value communicator implemented by the at least one processor for communicating, to the consumer NF, the first and second Retry-After header field values.

12. The system of claim 11 wherein the SBI request message includes a 3gpp-Sbi-Routing-Binding header with first and second routing binding indications identifying the first and second producer NFs as target NFs for the service and the SBI routing manager is configured to determine that the service can be provided by the first and second producer NFs by reading NF instance identifiers of the first and second producer NFs from the first and second routing binding indications.

13. The system of claim 11 wherein the response message from the first producer NF comprises an error response message including the first Retry-After header field value.

14. The system of claim 13 wherein the response message from the second producer NF comprises an error response message including the second Retry-After header field value.

15. The system of claim 11 wherein the Retry-After header field value communicator is configured to communicate the first and second Retry-After header field values to the consumer NF by transmitting, to the consumer NF, an SBI response message including the first and second Retry-After header field values.

16. The system of claim 15 wherein the Retry-After header field value communicator is configured to include the first and second Retry-After header field values in Problem-Details in a body of the SBI response message.

17. The system of claim 11 wherein the response message from the first producer NF includes a location header including a resource uniform resource indicator (URI) identifying a resource to which retries of the SBI request message should be directed and the Retry-After header field value communicator is configured to communicate the resource URI to the consumer NF.

18. The system of claim 15 wherein the Retry-After header field value communicator is configured to include at least one of the first and second Retry-After header field values in a header of the SBI response message.

19. The system of claim 18 wherein the Retry-After header field value communicator is configured to add a custom header to the SBI response message and include one of the first and second Retry-After header field values in the custom header and include the other of the first and second Retry-After header field values as a JavaScript object notation (JSON) information element (IE) included in a body of the SBI response message.

20. A non-transitory computer readable medium having stored thereon executable instructions that when executed by a processor of a computer control the computer to perform steps comprising:
   receiving, by a service communication proxy (SCP) and from a consumer network function (NF), a service-based interface (SBI) request message;
   determining, by the SCP, that the SBI request message requests a service that can be provided by first and second producer NFs;
   forwarding, by the SCP, the SBI request message to a first producer NF;
   receiving, by the SCP and from the first producer NF, a response message indicating that the first producer NF failed to process the SBI request message and including a first Retry-After header field value generated by the first producer NF;
   forwarding, by the SCP, the SBI request message to the second producer NF;
   receiving, by the SCP, a response message from the second producer NF indicating that the second producer NF failed to process the SBI request message and including a second Retry-After header field value generated by the second producer NF; and
   communicating, by the SCP and to the consumer NF, the first and second Retry-After header field values.

* * * * *